(12) United States Patent
Mueller

(10) Patent No.: US 6,484,951 B1
(45) Date of Patent: Nov. 26, 2002

(54) THERMOSTAT WITH CARBON MONOXIDE WARNING FEATURE

(75) Inventor: Carl J. Mueller, St. Louis, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 10/122,582

(22) Filed: Apr. 15, 2002

(51) Int. Cl.[7] .............................................. G05D 23/00
(52) U.S. Cl. ..................... 237/2 A; 237/12.3 C; 431/22; 126/116 A
(58) Field of Search .......................... 237/2 A, 12.3 C; 431/22, 16, 76; 126/116 A

(56) References Cited

U.S. PATENT DOCUMENTS

| | | | |
|---|---|---|---|
| 4,526,028 A | * 7/1985 | Huber | 340/632 |
| 4,893,113 A | * 1/1990 | Park et al. | 165/11.1 |
| 4,903,759 A | * 2/1990 | Lapeyrouse | 165/11.1 |
| 5,361,982 A | * 11/1994 | Liebl et al. | 236/46 R |
| 5,575,274 A | 11/1996 | DePalma | |
| 5,752,818 A | 5/1998 | Forster | |
| 5,793,296 A | 8/1998 | Lewkowicz | |
| 5,793,645 A | * 8/1998 | Rump et al. | 422/94 |
| 5,798,945 A | * 8/1998 | Benda | 340/310.01 |
| 5,838,243 A | 11/1998 | Gallo | |
| 6,045,352 A | 4/2000 | Nicholson | |
| 6,318,150 B1 | * 11/2001 | Temple | 432/32 |
| 6,370,945 B2 | * 4/2002 | Roberts | 324/694 |

* cited by examiner

Primary Examiner—Derek Boles
(74) Attorney, Agent, or Firm—Kevin Pumm

(57) ABSTRACT

A thermostat comprising an audible alarm or LCD, and sensing means for sensing at least one signal from at least one external carbon monoxide detector. The thermostat is configured to change the temperature setting to 50° F., and to trigger the audible alarm or flash a warning on the LCD display when receiving a signal from at least one carbon monoxide detector indicating the presence of a harmful level of carbon monoxide. The heating system's operation is not disabled but rather reduced to prevent potential freezing damage. The thermostat would continue the audible alarm, flashing warning and 50° F. temperature setting until it is reset.

14 Claims, 2 Drawing Sheets

THERMOSTAT WITH CARBON MONOXIDE WARNING FEATURE

FIELD OF THE INVENTION

This invention relates to carbon monoxide warning systems, and in particular, to systems for alerting an occupant of an excessive level of carbon monoxide gas.

BACKGROUND OF THE INVENTION

As a result of the increased concern over the dangers of carbon monoxide, many types of carbon monoxide detectors are currently available for sale to the public. These devices typically include a detection circuit that triggers an audible alarm to alert occupants of a harmful level of carbon monoxide gas. To provide further protection to the occupant, improvements have been made to disable the operation of gas-fired heaters, which may potentially be the source of the carbon monoxide gas. Such a device is disclosed in U.S. Pat. No. 5,793,296 issued to Lewkowicz, or in U.S. Pat. No. 5,838,243 issued to Gallo. However, upon detecting the presence of carbon monoxide gas, these devices either disable the operation of a thermostat connected to a heating system, or disable the flow of natural gas to a furnace or boiler. Installing such devices in primarily unoccupied vacation homes could potentially cause freezing damage to water pipes, resulting from the disabling of heating systems. Thus, there is still a need for a device that will both alert occupants of a harmful level of carbon monoxide gas and maintain the operation of a gas-fired heating system at a reduced level, to prevent potential freezing damage and reduce the potential for further carbon monoxide production.

SUMMARY OF THE INVENTION

There is provided, in accordance with one aspect of the invention, a digital thermostat comprising an LCD display or an audible alarm, and input means for receiving at least one signal from at least one carbon monoxide detector external to the thermostat. The thermostat is configured to trigger the audible alarm or flash a warning on the LCD display when receiving at least one signal from at least one carbon monoxide detector indicating the presence of a predetermined level of carbon monoxide gas. The thermostat is also configured to lower the set point temperature to approximately 50° F. to prevent potential freezing damage to water pipes and to reduce the potential for further carbon monoxide production. The minimal set point temperature of 50° F. could also prompt hearing-impaired occupants to view an LCD display, which would alert them of the presence of carbon monoxide gas with a flashing warning. The 50° F. set point, audible alarm, and flashing warning would remain in effect until the thermostat is manually reset.

In accordance with another aspect of the invention, the digital thermostat comprises a plurality of sensing means for sensing input signals received from at least one carbon monoxide detector external to the thermostat. One such sensing means comprises a filter circuit that monitors the waveform of the current through the thermostat's 24 VAC "heat load" terminals, which connect to a furnace control that incorporates a carbon monoxide detector. The furnace control may be configured to switch or chop the 24 VAC signal to the thermostat when the carbon monoxide detector indicates the presence of a predetermined level of carbon monoxide gas. The thermostat's filter circuit detects any high frequency fluctuations in the 24 VAC waveform generated by the furnace control and isolates the fluctuations as a signal, which may communicate the carbon monoxide level sensed by the furnace control's carbon monoxide detector. Another sensing means comprises a microprocessor in the thermostat that senses the presence of current through a second set of input terminals, which may be connected directly to a second external carbon monoxide detector.

It is thus an object of the invention to provide a thermostat that can receive signals from an external carbon monoxide detector indicating a harmful level of carbon monoxide gas, alert an occupant of the carbon monoxide, and reduce the operation of a gas-fired heating system which may potentially produce such carbon monoxide gas, without disabling the heating system.

It is a further object of the invention to provide a thermostat that comprises signal input monitoring means for a plurality of carbon monoxide detectors external to the thermostat, and that is configured to trigger an audible alarm and or flashing warning on the LCD display when receiving at least one signal from said detectors indicating a harmful level of carbon monoxide gas.

DETAILED DESCRIPTION OF THE PREFERRED EMBODIMENTS

Figure 1:
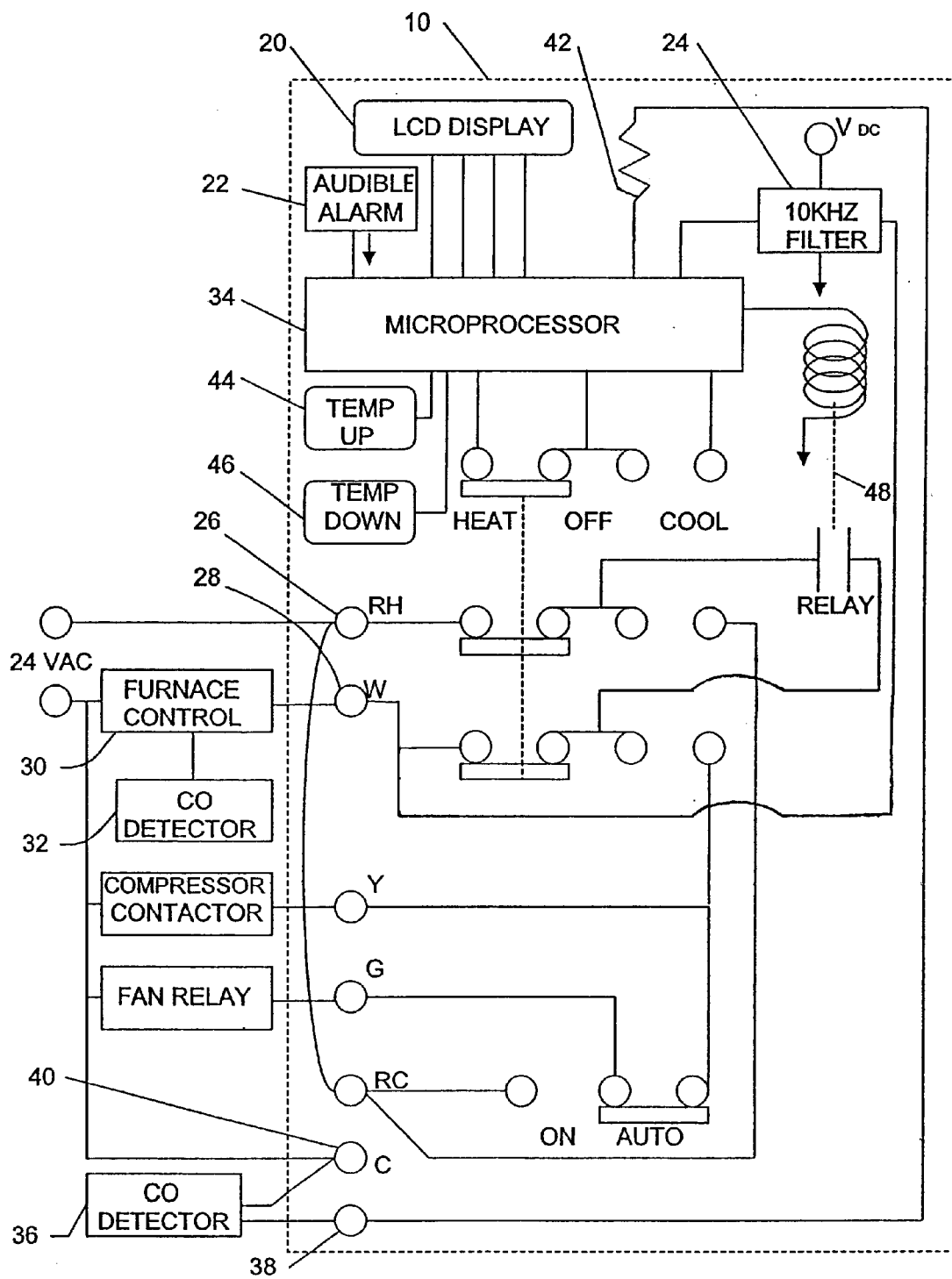
FIG. 1 is a schematic diagram of a digital thermostat incorporated into a heating system in accordance with the present invention.
Figure 2:
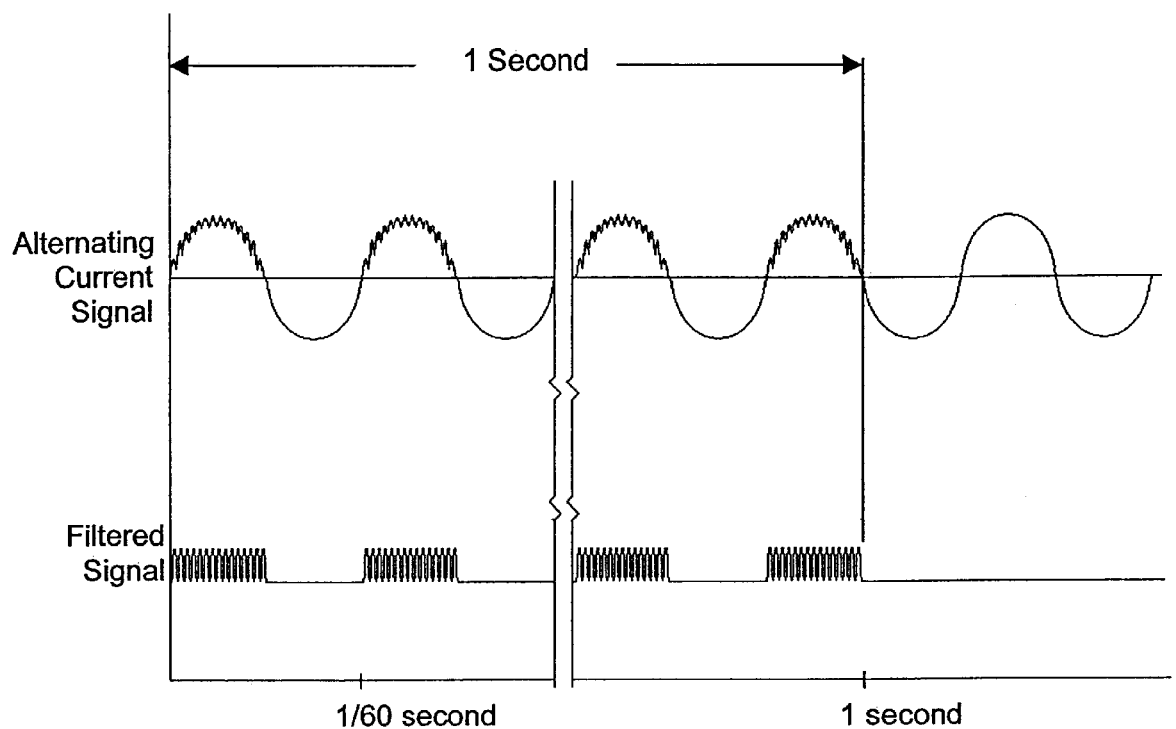
FIG. 2 is an example of a filtered waveform signal in accordance with the present invention.

A digital thermostat incorporating the carbon monoxide warning feature according to the principles of the present invention is indicated generally at 10 in FIG. 1. The digital thermostat 10 comprises an LCD display 20, an audible alarm 22, and input means for receiving at least one signal from at least one carbon monoxide detector external to the thermostat. The digital thermostat 10 further comprises sensing means for sensing input signals received from such carbon monoxide detectors. One such sensing means comprises a filter circuit 24 that monitors the waveform of the current through the thermostat's 24 VAC "heat load" terminals RH and W, which connect to a furnace control 30 that incorporates a carbon monoxide detector 32. The furnace control 30 may be configured to switch or chop the 24 VAC signal to the thermostat 10 when the carbon monoxide detector 32 indicates the presence of a predetermined level of carbon monoxide gas. Because such methods of altering the state of an alternating current waveform are well known in the art, the circuitry and use thereof will not be described in detail. The thermostat's filter circuit 24 detects any high frequency fluctuations in the 24 VAC waveform generated by the furnace control 30 and isolates the fluctuations as a signal, which is input to a microprocessor 34 in the thermostat 10. The filter circuit is preferably a 10 kHz high pass filter or the like. If the microprocessor 34 detects one-second durations of a high frequency signal that cycles on and off at 60 hertz as in FIG. 2, it would indicate the carbon monoxide detector 32 is sensing harmful levels of carbon monoxide. Detection of a high frequency signal that continuously cycles on and off at 60 hertz would indicate the carbon monoxide detector requires maintenance or replacement. A periodic, short-duration high frequency signal is used to verify communication operation. While the present invention comprises the above described signal sensing means, it should not be so limited as to exclude any modifications within the spirit of the invention.

Another sensing means comprises a microprocessor 34 in the thermostat 10 that senses the presence of current through terminals 38 and 40, which can be connected to a second external carbon monoxide detector 36. When sensing harmful CO levels, the carbon monoxide detector 36 closes a set of relay contacts to short input terminals 38 and 40, and establishes current flow from the 24 VAC supply to the microprocessor 34 through a resistor 42. The carbon monoxide detector may be for example the COSTAR Carbon Monoxide Detector Model 12E, or the like. Such a carbon monoxide detector provides a closed relay output signal when sensing the presence of 100 parts per million of carbon monoxide gas within 90 minutes.

In FIG. 1, the thermostat 10 is shown with a selector switch in the heat mode. In this mode of operation, the thermostat 10 initiates heating as required to maintain a set point temperature by energizing relay 48 to complete the 24 VAC circuit to the furnace control 30. The set point temperature is the user specified temperature that the digital thermostat maintains through control of a furnace or HVAC system. The furnace control 30 may switch the 24 VAC circuit to alter the waveform as a means of communicating to the thermostat 10 information concerning the sensed CO level, required maintenance, or malfunction of the carbon monoxide detector 32. When receiving at least one signal from at least one carbon monoxide detector indicating the presence of a predetermined level of carbon monoxide gas, the software program in the thermostat's microprocessor 34 changes the set-point temperature to 50° F., sends a flashing warning to the LCD display 20, and activates an audible alarm 22. The audible alarm is preferably of the piezo ceramic buzzer type, or the like. The thermostat's software program would remain in this mode until the thermostat is manually reset by simultaneously pressing and holding the temperature up key 44 and the temperature down key 46 for at least two seconds. Because such software programs for controlling a thermostat's operation and temperature setting are prevalently used and well known in the art, the software program will not be described in detail. The predetermined minimal set point temperature of approximately 50° F. stored in the microprocessor serves to prevent freezing damage to water pipes. Thus, the thermostat 10 can receive signals from an external carbon monoxide detector, alert an occupant of the presence of carbon monoxide, and reduce the operation of the controlled heating system without disabling the heating system and potentially causing damage.

Those skilled in the art will recognize that the inventive digital thermostat of this invention may be useful in many applications and for control of many gas-fired applications. Inasmuch as many modifications within the spirit of the invention will be apparent to those skilled in the art, the scope of the invention should be determined by reference to the claims appended below and the full scope of equivalents as provided by applicable laws.

What is claimed is:

1. A thermostat for controlling a gas-fired heating system for a space, comprising:

sensing means for sensing at least one signal from at least one carbon monoxide detector indicating a harmful level of carbon monoxide; and control means responsive to said sensing means for lowering the thermostat set-point temperature to a predetermined temperature effective for preventing freezing of water pipes.

2. The thermostat according to claim 1, wherein the control means comprises a microprocessor having a software program for controlling the operation of said heating system.

3. The thermostat according to claim 1, wherein the predetermined minimal temperature for the space is approximately 50° Fahrenheit.

4. The thermostat according to claim 2, further comprising an LCD display having a visible carbon monoxide warning, which is activated by said microprocessor upon sensing a harmful level of carbon monoxide.

5. The thermostat according to claim 2, further comprising an audible alarm, which is activated by said microprocessor upon sensing carbon monoxide.

6. The thermostat according to claim 2, wherein the sensing means comprises a high pass filter for isolating a high frequency signal from the wave form of an alternating current signal, to be input to said microprocessor.

7. The thermostat according to claim 2, wherein the sensing means comprises a microprocessor having a current sensing input pin.

8. A thermostat for controlling a gas-fired heating system for a space, comprising:

sensing means for sensing at least one signal from at least one carbon monoxide detector indicating a harmful level of carbon monoxide; and a microprocessor responsive to said sensing means for lowering the thermostat set-point temperature to a predetermined temperature effective for preventing freezing of water pipes, and an LCD display controlled by said microprocessor, having a visible carbon monoxide warning that is activated by said microprocessor upon sensing a signal indicating a harmful level of carbon monoxide gas.

9. The thermostat according to claim 8, wherein the predetermined minimal temperature for the space is approximately 50° Fahrenheit.

10. The thermostat according to claim 8, further comprising an audible alarm, which is activated by said microprocessor upon sensing carbon monoxide.

11. The thermostat according to claim 8, wherein the sensing means comprises a high pass filter for isolating a high frequency signal from the wave form of an alternating current signal, to be input to said microprocessor.

12. The thermostat according to claim 11, wherein the sensing means can sense a unique high frequency signal that indicates maintenance is required on the equipment sending the signal.

13. The thermostat according to claim 8, wherein the sensing means comprises a microprocessor having a current sensing input pin.

14. A method of operating a thermostat for controlling a heating system for a space having at least one carbon monoxide detector connected to the thermostat, the method comprising the steps of sensing a signal from at least one carbon monoxide detector indicating the presence of a harmful level of carbon monoxide gas, lowering the thermostat set-point temperature to a predetermined temperature effective for preventing freezing of water pipes, and activating an alarm.

* * * * *